United States Patent Office 3,528,941
Patented Sept. 15, 1970

---

3,528,941
SILOXANE CURED WITH AN ALKOXY-
CYCLOPOLYSILOXANE
Robert A. Murphy, Burnt Hills, N.Y., assignor to General
Electric Company, a corporation of New York
No Drawing. Filed Dec. 26, 1967, Ser. No. 693,152
Int. Cl. C08g 31/14, 51/04
U.S. Cl. 260—37        10 Claims

ABSTRACT OF THE DISCLOSURE

One package, room temperature vulcanizing compositions are provided comprising a mixture of a silanol-terminated polydiorganosiloxane, and an alkoxycyclopolysiloxane curing agent which can have chemically combined aminoxy radicals attached to silicon. The curable compositions also can contain certain Group IVa metal complexes as curing promoters. The curable compositions have been found to provide for elastomers exhibiting improved elongation (percent) and superior adhesion to concrete when allowed to cure in contact thereto under atmospheric conditions.

---

The present invention relates to curable compositions comprising a silanol-terminated polydiorganosiloxane and an alkoxycyclopolysiloxane.

Prior to the present invention, various room temperature vulcanizing organopolysiloxane compositions were available utilizing an acyloxysilane, such as methyltriacetoxysilane, as a curing agent. When utilized as a sealant, such room temperature vulcanizing organopolysiloxane compositions, for example, Smith et al. Pat. 3,293,204, assigned to the same assignee as the present invention, provide for organopolysiloxane elastomers exhibiting a satisfactory degree of adhesion to various unprimed substrates. Experience has shown however, that when utilized in contact with concrete or natural stone surfaces, such room temperature vulcanizing compositions generally do not bond satisfactorily. As a result, prior to the present invention, room temperature vulcanizing organopolysiloxane compositions utilizing an acyloxy curing agent, were not extensively employed to treat concrete or stone surfaces.

The present invention is based on the discovery that an alkoxycyclopolysiloxane curing agent, as described hereinafter, when utilized under substantially anhydrous conditions, at an effective amount, in combination with a silanol-terminated polydiorganosiloxane, can provide for room temperature vulcanizing compositions convertible to elastomers exhibiting an unexpectedly high degree of adhesion to unprimed concrete and stone surfaces.

In accordance with the present invention there is provided a room temperature vulcanizing composition, which is convertible to the elastomeric state upon exposure to moisture, comprising (1) 100 parts of a silanol-terminated polydiorganosiloxane consisting essentially of chemically combined units of the formula, (1)         R₂SiO and (2) 0.5 to 20 parts of an alkoxycyclopolysiloxane curing agent consisting essentially of a member selected from (A) an aminoxycyclopolysiloxane of the formula, (2)
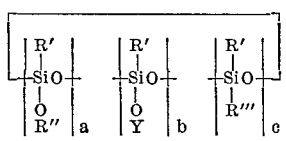

and (B) a mixture of
(i) an alkoxycyclopolysiloxane of the formula, (3)
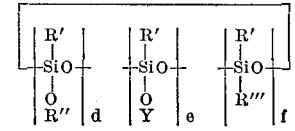

and (ii) from .01% to 1.5% by weight of metal, of a Group IVa metal complex, based on the weight of (1), where R is selected from monovalent hydrocarbon radicals, halogenated monovalent hydrocarbon radicals, and cyanoalkyl radicals, R' is selected from monovalent hydrocarbon radicals, R" is selected from alkyl radicals and halogenated alkyl radicals having from 1 to 8 carbon atoms, R'" is a monovalent hydrocarbon radical having from 2 to 20 carbon atoms selected from alkyl radicals and alkaryl radicals, Y is selected from the class consisting of amine radicals of formula —NRZ and heterocyclic amine radicals, where Z is selected from the class consisting of hydrogen and R, $a$ has an average value equal to 0.5 to 6.5 inclusive, $b$ has an average value equal to 1.5 and 3.5 inclusive, $c$ has an average value equal to 0 to 5 inclusive, the sum of $a+b$ has an average value equal to 3 to 8 inclusive, and when in combination with $c$, the sum of $a+b$ has an average value of at least 3, and the sum of $a+b+c$ has an average value equal to 3 to 8 inclusive, $d$ has an average value equal to 0.5 to 8 inclusive, $e$ has an average value equal to 0 to 3 inclusive, $f$ has an average value equal to 0 to 5 inclusive, the sum of $d+e$ has an average value equal to 3 to 8 inclusive, and when in combination with $f$, the sum of $d+e$ has an average value of at least 3, and the sum of $d+e+f$ has an average value of from 3 to 8 inclusive.

Included by the alkoxycyclopolysiloxanes of Formula 3 are cyclopolysiloxanes of the formula, (4)
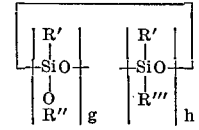

where R', R" and R'", are as previously defined, $g$ has an average value equal to 3 to 8 inclusive, $h$ has an average value equal to 0 to 5 inclusive, and the sum of $g+h$ has an average value equal to 3 to 8 inclusive.

Radicals included by R of Formula 1, are for example, aryl radicals and halogenated aryl radicals, such as phenyl, xylyl, chlorophenyl, tolyl, naphthyl, etc.; alkyl radicals, such as methyl, ethyl, propyl, butyl, pentyl, hexyl, heptyl, octyl, trifluoropropyl, tetrafluorobutyl, etc.; alkenyl radicals such as vinyl, allyl, 1-propenyl, etc.; cycloalkyl radicals, such as cyanoethyl, cyanopropyl, cyanobutyl, etc. Radicals included by R' are all of the aforementioned monovalent hydrocarbon and halogenated monovalent hydrocarbon radicals included by R. Radicals included by R" are all of the aforementioned R radicals having from 1 to 8 carbon atoms selected from alkyl radicals and halogenated alkyl radicals such as β-chloroethyl, τ-chloropropyl, ω-chlorobutyl, etc. Radicals included by R'", are all of the aforementioned alkyl radicals included by R and alkaryl radicals such as ethylenebenzene, trimethylenebenzene, etc. Radicals included by Y of Formulae 2 and 3 are, for example, amine radicals such as —NRZ, where R is as previously defined, and Z is selected from hydrogen and R. Y also includes heterocyclic amine radicals such as morpholino, piperidino, pyrrolidino, etc.

The alkoxycyclopolysiloxanes of Formula 4 can be made by effecting reaction between an aliphatic monohydric alcohol of the formula, (5)      R″OH and a cyclopolysiloxanehydride of the formula, (6) 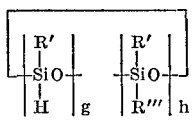

in the presence of a platinum catalyst, such as taught in Lamoreaux Pat. 3,313,773 and Ashby Pat. 3,159,601, etc. assigned to the same assignee as the present invention. Another technique which can be employed is by hydrolyzing the corresponding alkoxydihalosilane, for example, methylethoxydichlorosilane, etc., or by cohydrolyzing such alkoxydihalosilane with diorganodihalosilane, such as dimethyldichlorosilane. Included by the aliphatic monohydric alcohol of Formula 5, are for example, methanol, ethanol, propanol, chloropropanol, isopropanol, trifluoroethanol, butanol, amyl alcohol, isoamyl alcohol, etc.

Included by the alkoxycyclopolysiloxanes of Formula 4 are, for example,

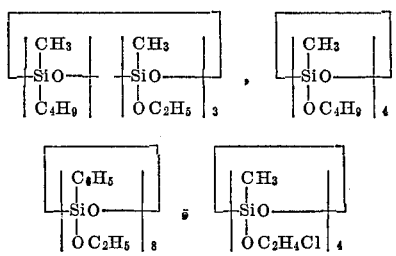

etc.

The aminoxycyclopolysiloxanes included by Formula 2 can be made by various procedures. One method, as taught in my copending application Ser. No. 693,165 filed Dec. 26, 1967, filed concurrently herewith and assigned to the same assignee as the present invention, involves effecting reaction beetween the aliphatic monohydric alcohol of Formula 5, and an aminoxycyclopolysiloxane of the formula, (7) 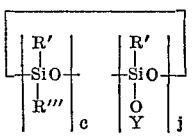

where R′, R‴, Y and c are as previously defined, j is an integer equal to 3 to 8 inclusive, and the sum of c and j has a value equal to 3 to 8 inclusive. The aminoxycyclopolysiloxane of Formula 7, and methods for making them are shown in my copending application, Ser. No. 423,354, filed Jan. 4, 1965, and assigned to the same assignee as the present invention.

Some of the aminoxycyclopolysiloxanes included by Formula 2 are as follows:

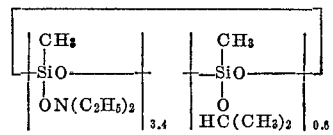

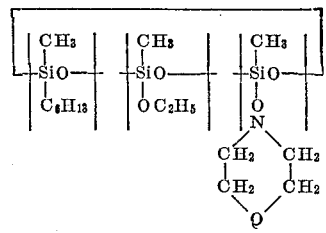

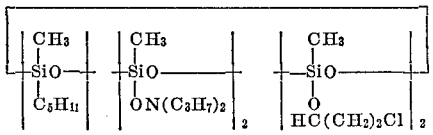

etc.

Some of the metal Group IVa metal complexes which can be used in the practice of the invention are, for example, zirconium dibenzoylmethane, zirconium oxalate, zirconium pentanedionate, etc., titanium acetyl acetonate, titanium dibenzoylmethane, etc., hafnium mandelate, hafnium hydroxyanthraquinonate, etc.

Included by the silanol-terminated organopolysiloxane consisting essentially of chemically combined units of Formula 1, are for example, linear diorganopolysiloxane of the formula, (8) 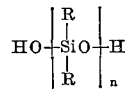

where R is as defined above, and $n$ is an integer having an average value equal to about 5 to 3,000 inclusive. These linear diorganopolysiloxanes, preferably have a viscosity in the range from about 500 to 500,000 centipoises, when measured at 25° C. These silanol-terminated fluids can be made by treating a higher molecular weight organopolysiloxane, such as a dimethylpolysiloxane, with water in the presence of a mineral acid, or basic catalyst. Methods for making such higher molecular weight organopolysiloxanes utilized in the production of silanol-terminated diorganopolysiloxanes of Formula 8 are well known. For example, hydrolysis of diorganohalosilane such as dimethyldichlorosilane, diphenyldichlorosilane, methylvinyldichlorosilane, etc., or mixtures thereof can provide for the production of low molecular weight hydrolyzate. Equilibration of the hydrolyzate, can provide for higher molecular weight organopolysiloxane. Equilibration of cyclopolysiloxane, such as octamethylcyclotetrasiloxane, octaphenylcyclotetrasiloxane, or mixtures thereof, also can provide for higher molecular weight polymers. Preferably, such polymers are decatalyzed of equilibration catalyst by standard procedures prior to use, such as shown by Boot Pat. 3,153,007, assigned to the same assignee as the present invention.

Silanol-terminated organopolysiloxanes having viscosities below 1200 centipoises can be made by treating organopolysiloxanes consisting essentially of chemically combined units of Formula 1 with steam under pressure. Other methods that can be employed to make silanol-terminated organopolysiloxanes are more particularly described in Pat. 2,607,792—Warrick and U.K. Pat. 835,790.

Various fillers and pigments can be incorporated in the silanol-terminated organopolysiloxane, such as for example, titanium dioxide, zirconium silicate, silica aerogel, iron oxide, diatomaceous earth, fumed silica, carbon black, precipitated silica, glass fibers, polyvinylchloride, ground quartz, etc. The amounts of filler used can obviously be varied within wide limits in accordance with the intended use. For example, in some sealant applications, the curable compositions of the present invention can be used free of filler. In other applications, such as the employment of the curable composition as a binding material, as much as 400 parts or more of filler, per 100 parts of organopolysiloxane can be employed. In such applications, the filler can consist of a major amount of extending materials, such as ground quartz, polyvinylchloride, etc., or mixtures thereof, preferably having an average particle size in the range of from about 1 to 10 microns. The compositions of the present invention preferably are employed as construction sealants, caulking compounds, etc. The exact amount of filler, therefore, will depend upon such factors as the application for which the organopolysiloxane composition is intended, the type of filler utilized, that is, the density of the filler, its particle size, etc.). Preferably, a proportion of from 10 to 300 parts of filler, which can include up to about 35 parts of a reinforcing filler, such as fumed silica filler, per 100 parts of a silanol-terminated organopolysiloxane is utilized.

In the practice of the invention, the room temperature vulcanizing organopolysiloxane compositions can be made by mixing together under substantially anhydrous conditions, either the aminoxycyclopolysiloxane of Formula 2, or alkoxycyclopolysiloxane of Formula 3 referred to hereinafter as either the "aminoxy" or "alkoxy" curing agent, the silanol-terminated organopolysiloxane consisting essentially of units of Formula 1, referred to hereinafter as the "silanol polymer," with the filler, etc. The order of addition of the ingredients is not critical. For example, the aminoxy curing agent can be mixed with the silanol polymer, followed by addition of the filler, or the aminoxy curing agent can be added to the mixture of the filler and the silanol polymer, etc. With respect to the alkoxy curing agent, the same procedure can be followed, utilizing the alkoxy curing agent as either a mixture of the Group IVa metal salt, and the alkoxycyclopolysiloxane, or employing the metal salt and alkoxycyclopolysiloxane separately. Experience has shown that optimum results can be achieved, if the resulting mixture has no more than 100 parts of water, per million parts of mixture. Preferably, mixing is accomplished at a temperature between 20° C. to 80° C.

After the room temperature vulcanizing organopolysiloxane composition is made, it can be stored for a substantial period of time if properly protected from moisture. The curable organopolysiloxane composition can remain in a fluid, curable state for periods of two years or more, if maintained at a temperature below 50° C. under substantially anhydrous conditions.

In order that those skilled in the art will be better able to practice the invention, the following examples are given by way of illustration and not by way of limitation. All parts are by weight.

EXAMPLE 1

Hexyl-tris-(diethylaminoxy)cyclotetrasiloxane of the formula,

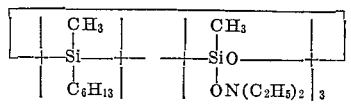

was prepared by the procedure shown in Example 7 of my copending application, Ser. No. 423,354, filed Jan. 4, 1965, now U.S. Pat. No. 3,441,583, issued Apr. 26, 1969. In accordance with this procedure, one mole of 1,3,5,7-tetramethyl,1-hexyl-3,5,7 - trihydrocyclotetrasiloxane was added to 3.3 moles of N,N-diethylhydroxyamine over a 2 hour period at a temperature between 0° C. to 70° C. under a nitrogen atmosphere. The mixture was then distilled under reduced pressure to provide for the removal of excess N,N-diethylhydroxylamine. There was obtained the above aminoxy-substituted cyclopolysiloxane, $\eta_d \alpha 1.4314$ Its identity was confirmed by its elemental analysis. The aminoxy-substituted cyclopolysiloxane was then mixed under substantially anhydrous conditions with an equal molar amount of isopropanol. The mixture was allowed to stand for 24 hours at 25° C. to achieve equilibrium. Based on method of preparation and its infrared spectrum, there was obtained a mixture consisting essentially of an aminoxycyclotetrasiloxane having the average formula,

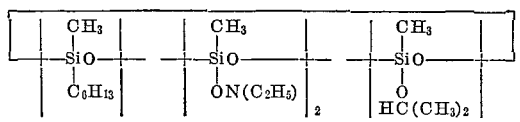

The identity of the mixture was confired by its elemental analyses (wt. percent): Theory: C, 46.4; H, 9.8; N, 6.5; Si, 17.4. Found: C, 44.95; H, 9.69; N, 6.30; Si, 18.82.

There was added to a mixture of 100 parts of a silanol-terminated polydimethylsiloxane having a viscosity of about 90,000 centipoises at 25° C., 10 parts of a hydrogenated castor oil thickner, 2 parts of fumed silica filler, 5 parts of the above aminoxycyclotetrasiloxane. The mixture was prepared under substantially anhydrous conditions and placed in a sealed container to protect it from atmospheric moisture. After a shelf period of 7 days, a cured slab was molded by allowing a portion of the mixture to cure under atmospheric conditions. The surface of the curable mixture was tack free after 24 hours, and plete cure was achieved after 48 hours. The cured slab had a tensile (p.s.i.) of 90 and an elongation (percent) of 1200. A similar slab was made after a shelf period of 28 days. It had a tensile (p.s.i.) of 76 and an elongation (percent) of 1100.

The curable composition was applied as a ½" x ½" x 2" sealant joint between the unprimed surfaces of two concrete blocks (2" x 3" x 1") made from Type I portland cement, standard mason's sand, and water (1:2:¾ by weight). The sealant joint was then allowed to cure between the blocks for 10 days at 77° F. and 55% R.H., followed by total submersion of the resulting composite in water for 4 days at 25° C.

The composite was then pulled under tension at a rate of about 0.5 inch per minute using an Instron tensile tester, until failure was achieved. Ultimate tensile strength (p.s.i.) an elongation (percent) at rupture, and percent cohesive failure were recorded. A composite experiencing 100% cohesive failure, would have residual rubber completely covering the original treated surface of the concrete block. This indicates that complete rupture of the elastomer occurred before a separation of the elastomer from the concrete surface was achieved. A composite showing 0% cohesive failure would indicate that there was a clean separation of the elastomer from the surface of the concrete. In other words, the concrete surface would be free of residual rubber.

In addition to the above described curable composition referred to hereinafter as "aminoxycyclopolysiloxane," several commercially available sealants, including both solvent release and room temperature vulcanizing cure systems, were also evaluated as concrete sealants, in accordance with the same test method. The table below shows the results obtained with the various compositions. "Acetoxy" is a one package, room temperature vulcanizing composition, as taught in French Pat. 1,408,662. "Urethane" is a room temperature vulcanizing polyether composition having isocyanate linkages. "Acrylic" is a solvent release composition consisting essentially of an aromatic hydrocarbon solvent and an acrylic terpolymer which forms an adhesive upon evaporation of the solvent.

| | Elongation (percent) | Tensile (p.s.i.) | Cohesive failure (percent) |
|---|---|---|---|
| Aminoxycyclopolysiloxane | 348 | 41 | 100 |
| Acetoxy | 20 | 47 | 0 |
| Urethane | 120 | 53 | 0 |
| Acrylic | 100 | 1 | 0 |

EXAMPLE 2

There was added under substantially anhydrous conditions, 182 parts of 1,3,5,7-tetrahydro-1,3,5,7-tetramethyl-cyclotetrasiloxane to a mixture of 225 parts of N,N-diethylhydroxylamine and 51 parts of dry isopropanol over a period of two hours, maintaining the reaction temperature between 25° C.–70° C. The mixture was allowed to stir under nitrogen sweep for 16 hours. An additional 11 parts of N,N-diethylhydroxylamine was added to the mixture to remove all traces of unreacted silicon hydride. The mixture was then stripped for two hours at 100° C.

at 30 mm. Hg to remove excess hydroxylamine. There was obtained a 95% yield of product. Based on method of preparation, there was obtained an aminoxycyclopolysiloxane of the formula,

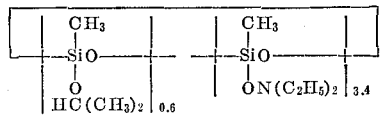

It had a refractive index of $\eta_d^{25}$ 1.4292. Its identity was confirmed by its elemental analysis (wt. percent): Theory: C, 40.70; H, 8.85; N, 8.33; Si, 19.70. Found: C, 39.86; H, 8.68; N, 7.61; Si, 20.25.

A second aminoxycyclopolysiloxane was made by a similar procedure. There was added 182 parts of 1,3,5,7-tetrahydro-1,3,5,7-tetramethylcyclotetrasiloxane to a mixture of 152 parts of dry isopropanol, and 75 parts of N,N-diethylhydroxylamine over a six hour interval, maintaining the reaction temperature below 70° C. The reaction mixture was allowed to stir under a nitrogen sweep for 16 hours. An additional 48.4 parts of 2:1 weight mixture of isopropanol: diethylhydroxylamine was added to complete the reaction. The mixture was then stripped of excess diethylhydroxylamine by heating it for two hours at 100° C. at 30 mm. Hg. An infra-red spectrum of the product showed that it was free of —OH. There was obtained about a 95% yield of product of the formula,

having a refractive index of $\eta_d^{25}$ 1.4130. Its identity was confirmed by its elemental analysis (wt. percent); Theory: C, 40.70; H, 8.67; N, 3.73; Si, 21.95. Found: C, 39.77; H, 8.69; N, 3.11; Si, 22.61.

A curing agent was prepared by mixing at ambient temperatures under substantially anhydrous conditions, 3 parts (0.00526 mole) of the first aminoxycyclopolysiloxane, and 7 parts (0.01372 mole) of the second aminoxycyclopolysiloxane. Based on method of preparation, there was obtained a curing agent having the average formula,

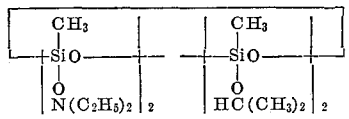

Five parts of the above curing agent was mixed under substantially anhydrous conditions with 100 parts of a mixture consisting of a silanol-terminated dimethylpolysiloxane having a viscosity of 93,000 centipoises at 25° C., and calcium carbonate, which contained about two parts of the dimethylpolysiloxane, per part of calcium carbonate. The resulting curable composition cured on exposure to air. There was obtained an elastomer having a hardness (Shore A) of 8, tensile (p.s.i.) of 173, and an elongation (percent) of 1100.

EXAMPLE 3

Butyl - tris-(N,N-diethylaminoxy)cyclotetrasiloxane of the formula,

was made in accordance with the procedure of Example 1. There was employed, one mole of 1-butyl,1,3,5,7-tetramethyl,3,5,7-trihydrocyclotetrasiloxane and 3.3 moles of N,N-diethylhydroxylamine. Excess diethylhydroxylamine was then stripped from the resulting mixture.

One mole of the butyl-tris-(N,N-diethylaminoxy)cyclotetrasiloxane was mixed at room temperature under substantially anhydrous conditions with 0.5 mole of isopropanol. The mixture was allowed to rest for 48 hours while protected from moisture. It was then stripped at reduced pressure to remove any free diethylhydroxylamine. Based on its method of preparation, the product was an aminoxycyclotetrasiloxane having the average formula,

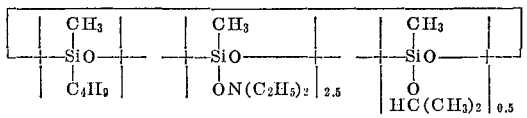

Elemental analyses (wt. percent) showed: Theory: C, 43.9; H, 9.18; N, 6.44; Si, 20.75. Found: C, 41.91; H, 9.15; N, 5.90; Si, 22.82.

A curable composition was prepared in accordance with the procedure of Example 1, utilizing 5 parts of the above aminoxycyclotetrasiloxane, per 100 parts of the mixture of silanol-terminated polydimethylsiloxane, hydrogenated castor oil thickener and fume silica. Another curable composition was prepared following the same procedure, except 5 parts of 2,4,6,8-tetramethyl-2-hexyl-4,6,8-tris-(diethylaminoxy)cyclotetrasiloxane was used in place of the above alkoxy containing aminoxycyclotetrasiloxane. Portions of the curable compositions were poured onto a tin plate and allowed to cure under atmospheric conditions. After 24 hours, tack free sheets were obtained which were cut into test slabs. The slab made from the composition containing the aminoxycyclotetrasiloxane having chemically combined isopropoxy radicals, had a higher elongation (percent) than the slab made with the aminoxycyclotetrasiloxane free of isopropoxy radicals.

EXAMPLE 4

One mole of $(CH_3(H)SiO)_4$ was mixed with 20 parts of platinum as a complex of butanol and chloroplatinic acid. The mixture was then warmed to 50° C. There was then added 6 moles of methanol at a rate sufficient to maintain the temperature at about 80° C. After addition, the product was distilled. There was obtained a 69% yield of 1,3,5,7-tetramethoxy-1,3,5,7-tetramethylcyclotetrasiloxane of the formula,

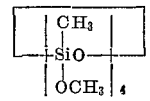

based on its infra-red spectrum and method of preparation. The cyclic distilled at 90°–100° C. at 0.25 mm.

A curable composition was prepared in accordance with the procedure of Example 1, utilizing 5.0 parts of the above 1,3,5,7-tetramethoxy,1,3,5,7-tetramethylcyclotetrasiloxane, and 0.23 part of zirconium in the form of zirconium pentanedionate $Zr_2O(C_5H_7O_2)_6$, per 100 parts of a silanol-terminated polydimethylsiloxane having a viscosity of 3100 centipoises at 25° C. The curable composition cured to a tack free elastomer after 24 hours under atmospheric conditions.

EXAMPLE 5

An alkoxycyclotetrasiloxane was made by mixing together under substantially anhydrous conditions, 0.6 mole of trifluoroethanol, per mole of 1-butyl, 1,3,5,7-tetramethyl, 3,5,7-tris(N,N-diethylaminoxy)cyclotetrasiloxane and allowing the mixture to rest for 48 hours. Based on method of preparation there was obtained a curing agent of the formula,

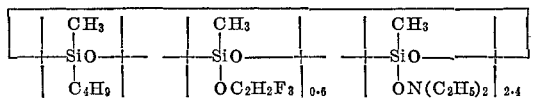

There was employed, 5 parts of the above curing agent, per 100 parts of the mixture of Example 1, of a silanol-terminated polydimethylsiloxane, hydrogenated castor oil thickener, and fumed silica. A tack free elastomer was obtained when the composition was allowed to contact atmospheric moisture for 24 hours.

EXAMPLE 6

An alkoxycyclotetrasiloxane was prepared by mixing under substantially anhydrous conditions, one mole of butyl-tris(N,N-diethylaminoxy)cyclotetrasiloxane, per 1.5 mol of isopropanol. The resulting mixture was allowed to rest under substantially anhydrous conditions for 48 hours and then stripped of volatiles. Based on the method of preparation, the alkoxycyclotetrasiloxane had the formula,

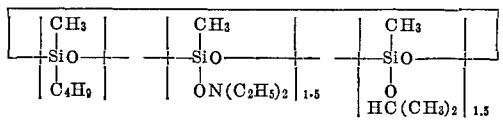

Five parts of the above alkoxycyclotetrasiloxane was mixed with one part of zirconium pentanedionate to produce a curing agent containing 3.83% by weight of zirconium. A curable composition was prepared by mixing under substantially anhydrous conditions, 6 parts of the zirconium containing curing agent, per 100 parts of the mixture of Example 1, consisting of silanol-terminated polydimethylsiloxane, hydrogenated castor oil, and fumed silica.

When the curable composition was exposed to atmospheric moisture a tack-free elastomer was obtained after about 60 hours.

EXAMPLE 7

A curable composition is prepared in accordance with the procedure of Example 1, utilizing 1.5 parts of the alkoxycyclotetrasiloxane described in Example 4, 1,3,5,7-tetramethoxy - 1,3,5,7-tetramethylcyclotetrasiloxane containing 2 percent by weight of titanium as titanium acetyl acetonate, per 100 parts of silanol-terminated polydimethylsiloxane having a viscosity of 3100 centipoises at 25° C. The curable composition becomes a tack-free elastomer after 72 hours under atmospheric conditions.

EXAMPLE 8

A curable composition is prepared in accordance with the procedure of Example 1, utilizing 5.0 parts of the alkoxycyclotetrasiloxane described in Example 4, 1,4,5,7-tetramethoxy - 1,3,5,7-tetramethylcyclotetrasiloxane, and 1.51 parts of zirconium as a complex having the average formula.

$$Zr_2O(OCH_3)_2(C_2H_7O_2)_4$$

per 100 parts of a silanol-terminated polydimethylsiloxane having a viscosity of 3100 centipoises at 25° C. The curable composition cures to a tack-free elastomer within 48 hours when exposed to atmospheric moisture.

While the foregoing examples have of necessity been limited to only a few of the very many variables within the scope of the present invention, it should be understood that the present invention is directed to a much broader class of room temperature vulcanizing compositions comprising silanol-terminated polydiorganosiloxane consisting essentially of chemically combined units of Formula 1 and a curing agent selected from an aminoxycyclopolysiloxane of Formula 2 or a mixture of an alkoxycyclopolysiloxane of Formula 3 and a Group IVa metal complex.

What I claim as new and desire to secure by Letters Patent of the United States is:

1. A room temperature vulcanizing composition which is convertible to the elastomeric state upon exposure to moisture comprising (1) 100 parts of a silanol-terminated polydiorganosiloxane consisting essentially of chemically combined units of the formula,

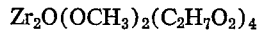

and (2) 0.5 to 20 parts of an alkoxycyclopolysiloxane curing agent consisting essentially of a member selected from (A) an aminoxycyclopolysiloxane of the formula,

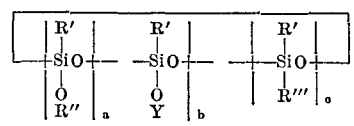

and (B) a mixture consisting essentially of
(i) an alkoxycyclopolysiloxane of the formula,

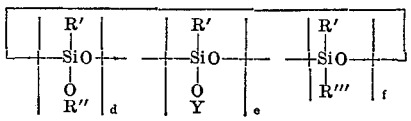

and (ii) from .01 to 1.5% by weight of metal, of a Group IVa metal complex, based on the weight of (1), where R is selected from monovalent hydrocarbon radicals, halogenated monovalent hydrocarbon radicals, and cyanoalkyl radicals, R' is selected from monovalent hydrocarbon radicals, R" is selected from alkyl radicals and halogenated alkyl radicals having from 1 to 8 carbon atoms, R''' is a monovalent hydrocarbon radical having from 2 to 20 carbon atoms selected from alkyl radicals and alkaryl radicals, Y is selected from the class consisting of amine radicals of formula —NRZ and heterocyclic amine radicals, where Z is selected from the class consisting of hydrogen and R, $a$ has an average value equal to 0.5 to 6.5 inclusive, $b$ has an average value equal to 1.5 to 3.5 inclusive, $c$ has an average value equal to 0 to 5 inclusive, the sum of $a+b$ has an average value equal to 3 to 8 inclusive, and when in combination with $c$, the sum of $a+b$ has an average value of at least 3, and the sum of $a+b+c$ has an average value equal to 3 to 8 inclusive, $d$ has an average value equal to 0.5 to 8 inclusive, $e$ has an average value equal to 0 to 3 inclusive, $f$ has an average value equal to 0 to 5 inclusive, the sum of $d+e$ has an average value equal to 3 to 8 inclusive, and when in combination with $f$, the sum of $d+e$ has an average value of at least 3, and the sum of $d+e+f$ has an average value of from 3 to 8 inclusive.

2. A curable composition in accordance with claim 1, comprising (1) 100 parts of a silanol-terminated polydiorganosiloxane consisting essentially of chemically combined units of the formula,

and (2) 0.5 to 20 parts of a curing agent consisting essentially of an aminoxycyclopolysiloxane of the formula,

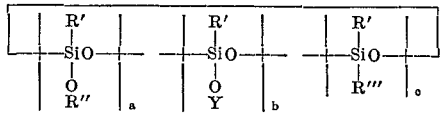

3. A room temperature vulcanizing composition in accordance with claim 1 comprising (1) 100 parts of a silanol-terminated polydiorganosiloxane consisting essentially of chemically combined units of the formula,

and 0.5 to 20 parts of a curing agent consisting essentially of an alkoxycyclopolysiloxane of the formula,

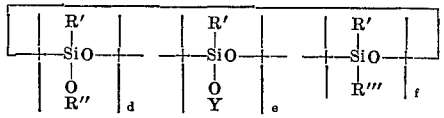

and from .01% to 1.5% by weight of metal of a Group IVa metal complex, based on the weight of (1).

4. A room temperature vulcanizing composition in accordance with claim 3, where the alkoxycyclopolysiloxane has the formula,

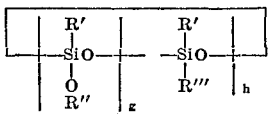

where R', R" and R'" are as defined in claim 1, $g$ has an average value equal to 3 to 8 inclusive, $h$ has an average value equal to 0 to 5 inclusive and the sum of $g+h$ has an average value of 3 to 8 inclusive.

5. A curable composition in accordance with claim 1, where the silanol-terminated polydiorganosiloxane is a silanol-terminated polydimethylsiloxane.

6. A curable composition in accordance with claim 1, where the alkoxycyclopolysiloxane curing agent is an aminoxycyclotetrasiloxane of the formula,

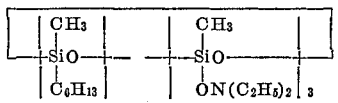

7. A room temperature vulcanizing composition in accordance with claim 1, where the alkoxycyclopolysiloxane curing agent is an aminoxycyclotetrasiloxane of the formula,

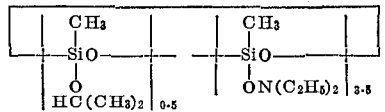

8. A curable composition in accordance with claim 1, where the alkoxycyclopolysiloxane curing agent is a mixture of 1,3,5,7-tetramethyl, 1,3,5,7-tetramethoxycyclotetrasiloxane and a zirconium pentanedionate complex.

9. A curable composition in accordance with claim 1, where the alkoxycyclopolysiloxane curing agent is a mixture of 1,3,5,7-tetramethyl, 1,3,5,7-tetramethoxycyclotetrasiloxane and a titanium acetyl acetonate complex.

10. A room temperature vulcanizing composition in accordance with claim 1 containing a silica filler.

References Cited

UNITED STATES PATENTS 3,234,175   2/1966   Pike.
3,419,516   12/1968   Tarno.

ALLAN LIEBERMAN, Primary Examiner

L. T. JACOBS, Assistant Examiner

U.S. Cl. X.R.
260—46.5